Nov. 20, 1923.
A. MARTIN
1,474,638
ELECTRIC WATER HEATER
Filed March 14, 1922
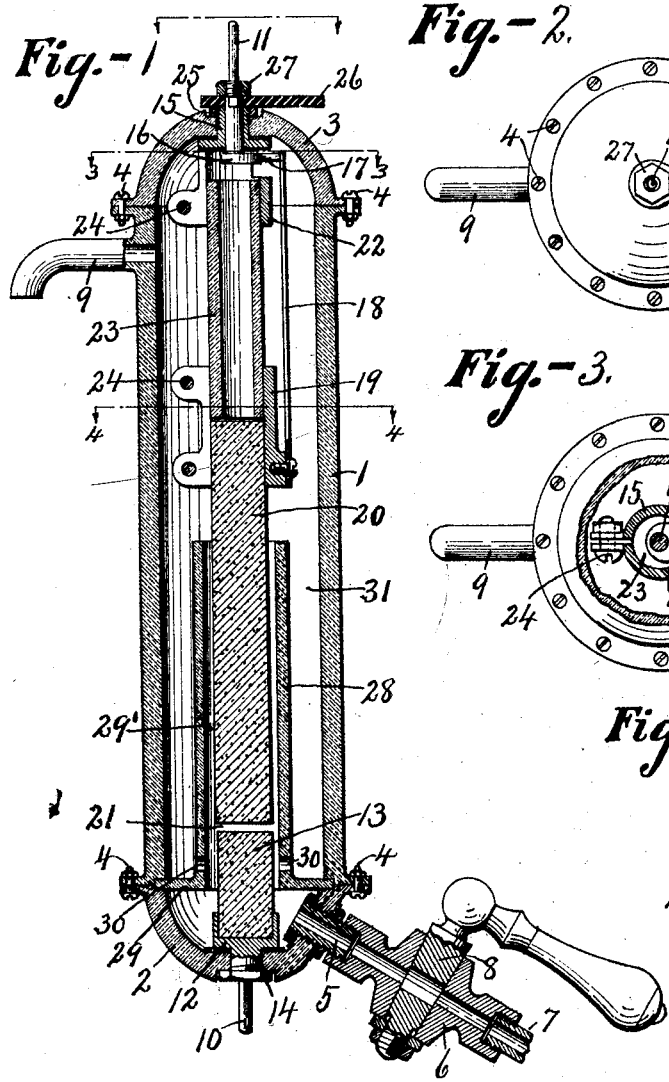
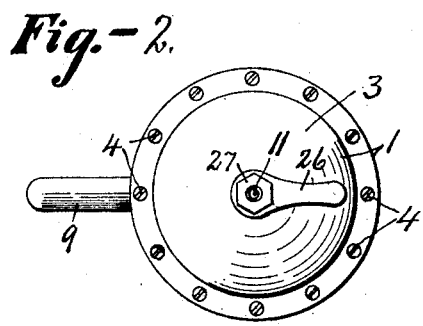
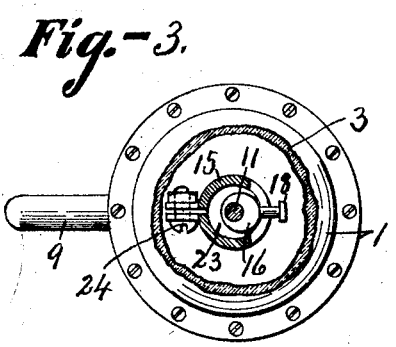
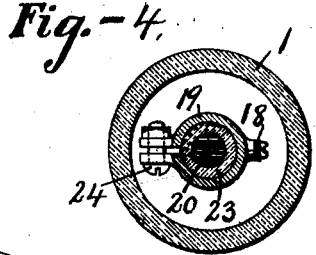
INVENTOR
A. Martin
BY
Howard P. Denison
ATTORNEY Patented Nov. 20, 1923.

1,474,638

UNITED STATES PATENT OFFICE.

ALPHONSE MARTIN, OF OGDENSBURG, NEW YORK.

ELECTRIC WATER HEATER.

Application filed March 14, 1922. Serial No. 543,672.

*To all whom it may concern:*

Be it known that I, ALPHONSE MARTIN, of Ogdensburg, in the county of St. Lawrence, in the State of New York, have invented new and useful Improvements in Electric Water Heaters, of which the following, taken in connection with the accompanying drawings, is a full, clear, and exact description.

This invention relates to an electric water heater involving the use of an upright container having an inlet and an outlet and co-operative electrodes therein for producing an electric arc as the heating medium for the water which is admitted to the container together with thermo-electric means for controlling the circuit and thereby controlling the temperature of the water.

The main object is to provide a simple, compact and efficient device of this character in which the water entering the container may be heated and maintained at a uniform temperature for delivery at the outlet and at the same time to provide means whereby the temperature of the water may be varied at will by proper adjustment of the thermostatic switch.

Another object is to place the electric arc close to the inlet of the container and to cause the inflowing water to be distributed to a relatively narrow channel in and around the arc so that it may be heated and expanded toward the outlet immediately upon its entrance into the container.

Other objects and uses relating to specific parts of the apparatus will be brought out in the following description:

In the drawings:

Figure 1 is a longitudinal vertical sectional view of an electric water heater embodying the various features of my invention.

Figure 2 is a top plan of the same device.

Figures 3 and 4 are horizontal sectional views taken, respectively, in the planes of lines 3—3 and 4—4, Figure 1.

As illustrated, this device comprises an upright cylindrical container —1— having lower and upper end heads —2— and —3— removably secured to the adjacent ends of the main body of the container by clamping bolts —4—.

The lower head —2— is provided with an inlet nipple —5— projecting laterally from one side thereof for securement to a suitable valve-case —6— which may be connected by a pipe —7— to any available source of water supply and is provided with a valve —8— for controlling said supply to the interior of the container —1—. The container —1— is provided near its upper end with a laterally projecting discharge nozzle —9— of relatively small size as compared with the interior cross-sectional area of the container, said nozzle being open to permit the flow of the heated water therethrough as may be regulated by the valve —8— or by the expansion of the water in the container, the inlet —5— being of substantially the same cross-sectional area as the outlet to allow the water to be heated to the desired temperature in the container when it reaches the desired level by the opening of the valve —8—.

A pair of terminals —10— and —11— of an electric circuit are secured, respectively, in the lower and upper end heads —2— and —3— in coaxial relation, the lower terminal being provided with an enlarged inner socketed end —12— for receiving and supporting a carbon electrode —13— coaxially with the axis of the tubular container section —1—.

The portion of the terminal —10— extending through the adjacent head —2— is threaded and engaged by a nut —14— to clamp said terminal rigidly in place and to permit it to be removed when necessary.

The upper terminal —11— is journaled in a bushing —15— in the adjacent end head —3— for rotary adjustment and is provided at its inner end with an eccentric contact member —16— cooperating with the similar contact member —17— of a thermostatic bar —18— which in turn extends lengthwise of and within the container —1— and has its lower end secured to a collar —19— carrying an additional electrode —20— for cooperation with the electrode —13— in forming an arc gap —21— for heating purposes.

The bushing —15— is provided with an enlarged inner socketed end —22— for receiving the upper end of a tubular member —23— having its lower end secured in the upper end of the collar —19— coaxial with the electrode —20—, thereby supporting the last named electrode from the upper end head —3—. The socketed member —22— and collar —19— are split longitudinally through one side to enable them to be drawn tightly upon the adjacent ends of the tube —23— and electrode —20— by clamping bolts —24— passing through opposite sides of the division.

The outer end of the bushing —15— is threaded and engaged by a nut —25— for rigidly securing said bushing in place upon the head —3— and permitting it to be removed when necessary.

An operating handle or lever —26— is keyed or otherwise secured to the terminal —11— close to the outer end of the head —3— and is additionally held in place by a clamping nut —27— engaging a threaded portion of said terminal.

A tubular sleeve —28— is provided at its lower end with an annular flange —29— rigidly clamped between the meeting ends of the lower head —2— and container section —1— and extends upwardly therefrom nearly half the length of the container around the electrodes —13— and —20— in spaced relation thereto to form an intervening annular water passage —29'— which is open at the top and communicates near its lower end with the interior of the container —1— through radial passages —30— in said sleeve just above the flange —29—.

The exterior diameter of the sleeve —28— and also that of the collar —19—, tubular member —23— and socketed member —22— is considerably less than the interior diameter of the tubular section —1— of the container to form a water-receiving chamber —31— which extends from the flange —29— to the upper head —3—, said flange serving as a means for cutting off direct communication from the chamber —1— and inlet —5—.

The lower carbon electrode —13— is relatively short in that it extends from the terminal —12— in the lower head into the lower end of the passage —29'— of the sleeve —28— and a short distance above the branch passage —30—.

On the other hand, the upper electrode —20— extends downwardly through the major portion of the sleeve —28— to a point within a short distance of the upper end of the electrode —13— to form the gap —21—, the upper end of said electrode —20— being extended some distance above the corresponding end of the sleeve —28— for securement to the collar —19— which is spaced apart from the upper end of the sleeve —28— but some distance below the outlet —9—.

The split bushing —22— is located above the outlet and it, therefore follows that the tube —23— extends across the outlet and serves as a means of supporting the collar —19— from the split bushing —22— which is centrally secured in the upper end head —3—.

The socketed member —12— of the lower terminal —10— is made of metal or other electric conducting material in electric connection with the adjacent electrode —13—, while the collar —19— is also made of metal or electric conducting material in electrical contact with the upper electrode —20—.

The sleeve —23— connecting the bushing —15— and collar —19— is preferably made of insulating material, such as porcelain and serves to hold said collar and bushing in spaced insulated relation and also serves to insulate the upper terminal —11— from the collar.

The thermostatic bar —18— which is secured to and in electrical contact with the collar —19— bridges the space between said collar and bushing —15— and is adjusted to normally contact with the eccentric member —16— of the terminal —11— to close the circuit through the electrodes and thereby to form an electric resistance at the gap —21— for water heating purposes.

The thermostatic bar —18— may be of any suitable construction preferably of the compound bar type in which the members have different co-efficients of expansion and are arranged to open the contact member —17— when the temperature of the water in the container reaches a predetermined degree preferably not greater than 212 degrees F. at which time the contact will be broken and the circuit opened to prevent further increase of the temperature of the water.

It is evident, however, that this maximum temperature may be varied at will by simply adjusting the eccentric contact member —16— rotarily through the medium of the hand-piece —28—.

If desired, the main body of the container —1— and its end heads —2— and —3— may be of insulating material, such as porcelain although it is evident that other means may be provided for insulating the electrodes one from the other to prevent short circuits and assure a maximum electrical resistance at the gap —21— and that other changes may be made in the detail of construction of the apparatus without departing from the spirit of this invention.

Operation.

In operation by opening the valve —8—, the water admitted to the chamber in the lower head —2— will rise through the lower end of the passage —29'— and thence through the branch passages —30— into the main chamber —31— and passage —29'— until it approaches or overflows through the outlet —9— when the valve —8— is closed to allow the water in the container to become heated to the desired temperature.

The heating of the relatively small body of water in the chamber —29'— is practically instantaneous or at least considerably more rapid than that in the chamber —31— and causes said heated water to expand upwardly and to overflow into said chamber —31— and the cooler water in the last named chamber to flow through the branch passages —30— into the lower end of the chamber —29'— for reheating, thereby establishing local circulation upwardly through the chamber —29'— and back through the chamber —31— and passages —30— to said chamber —29'— and as the water in both chambers becomes heated to the required temperature, it expands upwardly toward the outlet —9— ready for use when the valve —8— is again opened.

This brings the heated water into direct contact with the thermostatic bar —18— which together with the contact member —16— are adjusted to maintain a closed heating circuit until the temperature reaches a predetermined degree of say 212 degrees at which time, the thermostatic bar —18— will have been deflected to break contact with the terminal member —16— thereby breaking the heating circuit and preventing further heating of the water until the temperature in the container falls below said predetermined degree, whereupon the contacts will again close the circuit through the electrodes for restoring the temperature of the water to that degree, all of which contributes to the maintenance of an even temperature of a small body of water in the container ready for use at any time by simply opening the valve —8— to expel the heated water through the outlet —9— by the inflowing cool water admitted at the same time, the valve —8— being usually closed before the heated water is expelled.

This device is useful in any relation in which small quantities of heated water are to be supplied intermittingly or at irregular intervals and it is evident that the structural details may be varied at will without departing from the spirit of the invention.

What I claim is:—

1. An electric water heater comprising a container having an inlet and an outlet, cooperative electrodes of an electric circuit forming an arc-gap within the container for heating the water therein and heat-control means in contact with the water within the container for opening and closing the circuit as the temperature varies from the predetermined degree.

2. An electric water heater comprising a container having an inlet and an outlet, cooperative electrodes of an electric circuit forming an arc-gap within the container for heating the water therein, and heat-control means in contact with the water within the container for opening and closing the circuit as the temperature varies from the predetermined degree, said means being adjustable at will for varying the period of opening of the circuit and thereby varying the maximum temperature of the heated water.

3. In an electric water heater, the combination of an upright container having an inlet near its lower end and an outlet near its upper end, cooperative electrodes supported within the container to form an intervening arc-gap between the inlet and outlet but nearest to the inlet, a tubular sleeve surrounding the arc-gap and adjacent portions of the electrodes in spaced relation thereto to form an intervening water passage open at the top and bottom for communication, respectively, with the inlet and with the interior of the container.

4. In an electric water heater, the combination of an upright container having an inlet near its lower end and an outlet near its upper end, cooperative electrodes supported within the container to form an intervening arc-gap between the inlet and outlet but nearest to the inlet, a tubular sleeve surrounding the arc-gap and adjacent portions of the electrodes in spaced relation thereto to form an intervening water passage open at the top and bottom for communication, respectively, with the inlet and with the interior of the container, said sleeve having a branch passage near its lower end connecting the interior of the sleeve with the water chamber of the container.

5. An electric water heater comprising an upright container having a main water chamber provided with an outlet, terminals of an electric circuit in the lower and upper ends of said chamber, an electrode in electrical connection with the lower terminal, an additional electrode in electrical connection with the upper terminal and in spaced relation to the first named electrode to form an intervening arc-gap, a tubular sleeve surrounding the arc-gap and adjacent portions of the electrodes and communicating with the main chamber, and means for passing water in to the sleeve to be heated by the electric arc.

6. An electric water heater comprising a container having a main water chamber and provided with an inlet and an outlet, electrodes supported within the container in spaced relation to form an arc-gap, means for supplying electric current to the electrodes including thermo-electric means within the container for controlling the circuit through the electrodes.

7. An electric water heater comprising an upright container having an inlet near its lower end and an outlet near its upper end, electrodes supported within the container in spaced relation to form an intervening arc-gap near the lower end of the container, a tube surrounding the arc-gap and adjacent portions of the electrode in spaced relation thereto to form an intervening passage, said passage communicating with the interior of the container at a point below the arc-gap, an electric terminal in electrical connection with the lower electrode, a thermostatic bar in electrical connection with the upper electrode, an additional terminal having normal electric contact with the thermostatic bar and adjustable at will to vary the period of breaking of the circuit by the operation of the thermostatic bar, said terminals forming parts of the electric circuit for supplying current to the electrode.

In witness whereof I have hereunto set my hand this 8th day of March, 1922.

ALPHONSE MARTIN.

Witnesses:
 NELSON J. DOE,
 ISIDORE ROSOFF.